(12) United States Patent
Previdi (10) Patent No.: US 7,545,756 B2
(45) Date of Patent: Jun. 9, 2009

(54) METHOD AND APPARATUS FOR CONSTRUCTING A FORWARDING INFORMATION STRUCTURE

(75) Inventor: Stefano Benedetto Previdi, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 691 days.

(21) Appl. No.: 11/112,506

(22) Filed: Apr. 21, 2005

(65) Prior Publication Data

US 2006/0239211 A1    Oct. 26, 2006

(51) Int. Cl.
*H04L 12/28* (2006.01)
(52) U.S. Cl. ...................................... 370/256; 370/351
(58) Field of Classification Search ............ 370/395.31, 370/238, 237, 235, 229, 238.1, 351, 356, 370/392, 256, 216–228; 709/238, 239, 240, 709/241, 242
See application file for complete search history.

(56) References Cited

U.S. PATENT DOCUMENTS 5,471,467 A * 11/1995 Johann ..................... 370/238
2006/0140136 A1* 6/2006 Filsfils et al. .............. 370/255

OTHER PUBLICATIONS

McQuillan, John M., et al., "The New Routing Algorithm for the ARPANET," IEEE Transactions on Communications, vol. Com-28, No. 5, May 1980, pp. 711-719.

* cited by examiner

*Primary Examiner*—Chirag G Shah
*Assistant Examiner*—Nima Mahmoudzadeh
(74) *Attorney, Agent, or Firm*—Hickman Palermo Truong & Becker (57) ABSTRACT

A method of constructing a forwarding information structure for forwarding data in a data communications network comprising as components and links therebetween comprises the step, performed at a constructing node, of detecting a component change. The method further comprises the step, performed at a constructing node, of assessing the extent of a corresponding change required to an existing forwarding information structure at the constructing node.

24 Claims, 5 Drawing Sheets

METHOD AND APPARATUS FOR CONSTRUCTING A FORWARDING INFORMATION STRUCTURE

FIELD OF THE INVENTION

The present invention generally relates to forwarding information structures. The invention relates more specifically to a method and apparatus for constructing a forwarding information structure.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (for example, routers directing the packet along one or more of a plurality of links connected to it) according to one of various routing protocols.

One class of routing protocol is the link state protocol. The link state protocol relies on a routing algorithm resident at each node. Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in the direction AB along a link may be different from the cost in a direction BA. Based on the advertised information in the form of a link state packet (LSP) each node constructs a link state database (LSDB), which is a map of the entire network topology, and from that constructs generally a single optimum route to each available node based on an appropriate algorithm such as, for example, a shortest path first (SPF) algorithm. As a result a "spanning tree" (SPT) is constructed, rooted at the node and showing an optimum path including intermediate nodes to each available destination node. The results of the SPF are stored in a routing information base (RIB) and based on these results the forwarding information base (FIB) or forwarding table is updated to control forwarding of packets appropriately. When there is a network change an LSP representing the change is flooded through the network by each node adjacent the change, each node receiving the LSP sending it to each adjacent node.

As a result, when a data packet for a destination node arrives at a node the node identifies the optimum route to that destination and forwards the packet to the next node ("next hop") along that route. The next node repeats this step and so forth.

The SPF algorithm comprises an implementation of the Dijkstra algorithm. The algorithm is well understood by the skilled reader and is well documented in pre-existing documentation and therefore is not described in detail here but only in summary, for the purposes of clarity.

In general a constructing node calculates its least cost (shortest path) routes to each other node on the network from its LSDB. To do this, all nodes on the network are divided into three categories, unknown (UNK), tentative or candidate (TENT) and known (PATHS). For each node the cost of reaching that node from the constructing node, and the interface along which it is reached at that cost (representing the next hop) are stored. Initially the constructing node is assigned to category TENT and all other nodes are assigned to UNK. The algorithm then carries out repeatedly the step of moving the lowest cost node in TENT to PATH and moving all neighbours of that lowest cost node together with their cost via the corresponding interface from the constructing node to TENT. As a result, in the first step the constructing node is moved to PATH and each of its neighbours to TENT. In the next step the lowest cost node in TENT is moved into PATH and its neighbours are moved into TENT. As a result the nodes in UNK and TENT gradually deplete until all nodes have been moved to PATH. As a result PATH comprises a list of the lowest cost interface (or next hop) for routing data from the constructing node to each other node.

As a result the spanning tree is constructed rooted at the constructing node and with branches to each next hop, that is each neighbor node. Each neighbour node then has branches to each of its next hops which the constructing node would reach via the neighbor node as shortest path, and the tree expands accordingly providing a single route to each node reachable from the constructing node. As a result it is possible to derive from the spanning tree which of the constructing node's neighbor nodes serves as next hop for any destination node within the SPT, allowing population of the FIB and hence RIB with appropriate forwarding/routing information. It will be noted that the SPT will only carry information for nodes which are reachable from the constructing node and so may not have information for all nodes in the LSDB if some of those nodes are unreachable.

When the network topology changes, for example a component such as a link or node changes either by variation in a metric such as link cost or by addition or failure of a node then conventionally the SPT must be recomputed from scratch using the SPF algorithm. However in one known approach described in co-pending patent application Ser No. 09/687, 009, filed 12 Oct. 2000, entitled "Method and System for Accelerating Route Calculation in Link State Routing Protocols" of John Harper, SPF has been extended using the incremental SPF (I-SPF) optimization which speeds up the routing computation by updating the SPT rather than recomputing it from scratch at each topology change. In particular I-SPF recognizes that only the affected part of the SPT requires recomputation. Using I-SPF, the nodes in the affected branch (for example all nodes "downstream" of a failed node or link component) are identified and reattached to the remaining, unchanged part of the tree for example by placing the affected nodes back into TENT and rerunning the SPF algorithm in respect of those nodes until they are all attached.

However it is found that I-SPF improvement may not be significant when processing certain network events and in particular there may be cases where a topology change requires more computation and hence CPU time if computed by I-SPF rather than a full SPF recomputation. In particular such events comprise link or node failure events, especially when the failure is close to the computing router that is constructing the SPT. This is because the entire branch of the SPT attached to the failed component must be reattached somewhere else in the SPT, and the size of the affected branch tends to increase the closer the failure is to the constructing node, increasing the work carried out by the I-SPF algorithm correspondingly.

To compensate for this, in one known approach, where I-SPF has been configured on a router, a full SPF is nonetheless executed for local failures at the computing router. However it is possible that remote failures may still require significant I-SPF computation whereas local failures may be repaired by I-SPF very efficiently.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for constructing a forwarding information structure is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Constructing a Forwarding Information Structure
4.0 Implementation Mechanisms—Hardware Overview
5.0 Extensions and Alternatives

1.0 General Overview

The needs identified in the foregoing Background, and other needs and objects that will become apparent for the following description, are achieved in the present invention, which comprises, in one aspect, a method for constructing a forwarding information structure for forwarding data in a data communications network comprising as components nodes and links therebetween. The method comprises the step, performed at a constructing node, of detecting a component change. The method further comprises the step, performed at the constructing node, of assessing the extent of a corresponding change required to an existing forwarding information structure.

In other aspects, the invention encompasses a computer apparatus and a computer-readable medium configured to carry out the foregoing steps.

2.0 Structural and Functional Overview

Figure 1:
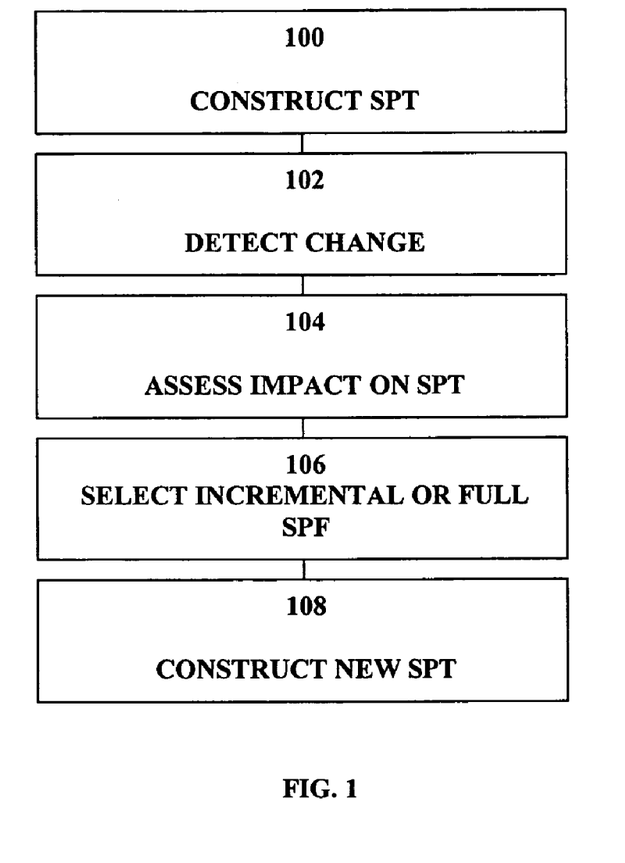
FIG. 1 is a flow diagram illustrating at a high level a method of constructing a forwarding information structure.

In overview, the method of constructing the forwarding information structure can be understood with reference to FIG. 1 which depicts a high level flow diagram illustrating an embodiment of the method. In block 100 the forwarding information structure for example an SPT is constructed based on information in the LSDB in any conventional manner. In block 102 a network topology change is detected at the constructing node for example by receipt of an appropriate advertisement or notification such as an LSP. In block 104 the constructing node assesses the impact on the SPT. In one embodiment, "assessment" in block 104 involves determining the extent of the change required to the SPT as a result of the topology or component change. For example the constructing node assesses how many nodes are associated with the component change, for example how many require reattachment as a result of a component failure. In block 106 the constructing node then selects either a full SPF computation of the SPT or an incremental update to the SPT using I-SPF. The selection is carried out dependent on the extent to which the SPT is affected by the topology change. For example if the number of nodes which require reattachment exceeds a threshold number then the constructing node will select a full SPF recomputation as the incremental SPF approach may not provide an optimization in the circumstances. In block 108 the SPT construction takes place either by implementation of incremental or full SPF algorithm as appropriate.

3.0 Method and Apparatus for Constructing a Forwarding Information Structure Implementation of the method will be described in more detail with reference to FIG. 2 which depicts an illustrative network diagram to which the solution is applied. It will be appreciated that the network shown is for the purposes of example only and the method can be applied to any appropriate network topology. The network designated generally 200 includes nodes A, B, C, D, E, F, G, H reference numerals 202, 204, 206, 208, 210, 212, 214, 216 respectively. Node A is joined to nodes B and C via respective links 218, 220. Node D is connected to nodes B, C and E via respective links 222, 224, 226 respectively. Node E is further connected to nodes F and H via links 228, 230 respectively. Node G is connected to nodes F and H via links 232, 234 respectively. All links have a cost 1 except for link 218 joining nodes A and B and link 230 joining nodes E and H which have cost 2.

Figure 3:
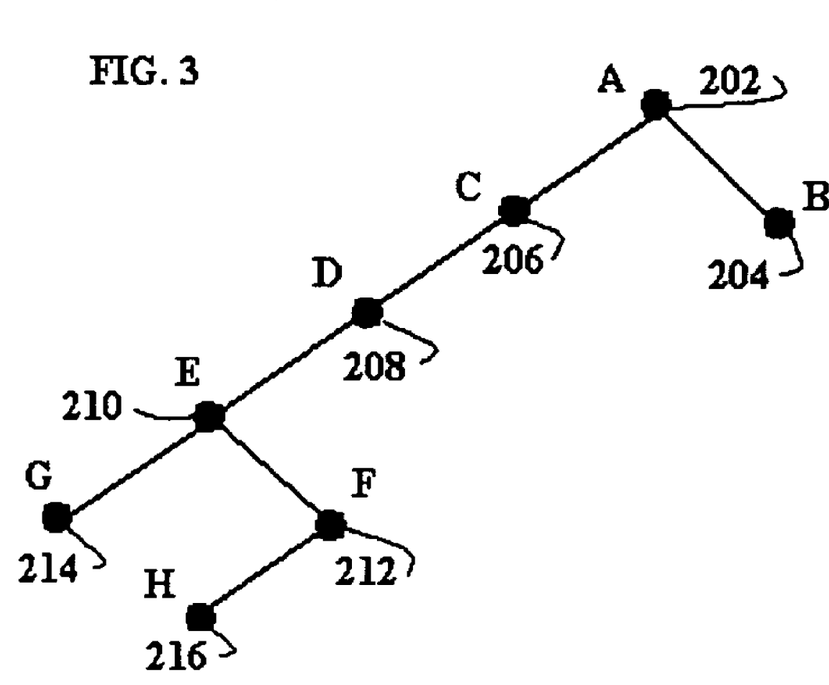
FIG. 3 is a spanning tree diagram corresponding to the network of FIG. 2.

As a result an SPT rooted at node A as constructing node can be constructed as shown in FIG. 3 which depicts a corresponding spanning tree diagram. In particular it will be seen that node A has branches to its two neighbor nodes, nodes B and C. Node C branches to node D as node C comprises node A's shortest path next hop to node D (total cost 2) rather than via node B (total cost 3). Node D branches to node E which in turn branches to its neighbor nodes, node F and node H. Node F branches to node G as it provides node A's lowest cost route to node G.

Figure 2:
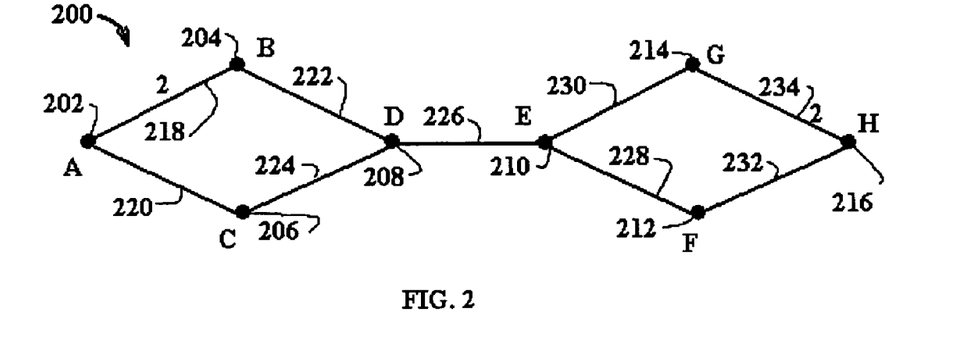
FIG. 2 is a representation of a network illustrating a method of constructing a forwarding information structure.
Figure 4:
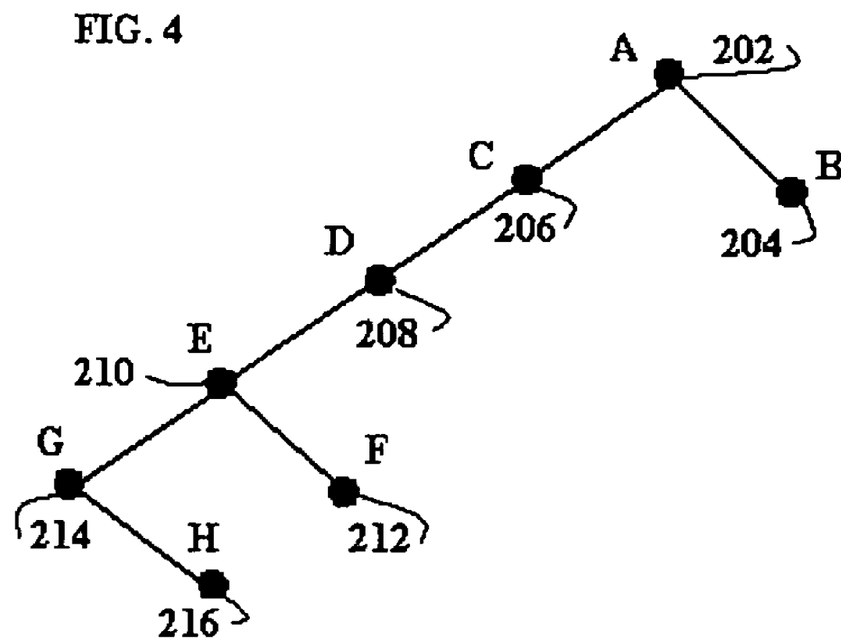
FIG. 4 is a spanning tree diagram corresponding to the network of FIG. 2 after a first failure.

Accordingly the spanning tree diagram of FIG. 3 represents the initial SPT constructed at node A for the topology shown in FIG. 2. In the event of failure of a component in the network shown in FIG. 2, the SPT rooted at node A may have to be re-constructed accordingly. For example in the case that link 232 between nodes F and G fails then the revised SPT is shown in FIG. 4 which depicts a spanning tree diagram for the changed topology. In particular it will be seen that node H has reattached to node G. The SPT shown in FIG. 4 can be constructed by recomputation of the entire SPT rooted at A for the revised topology. However it will be seen that simply by identifying all child nodes of the failed link 232—in this case only node G, it is simply necessary to reattach node G as appropriate using I-SPF significantly reducing the computational burden.

Figure 5:
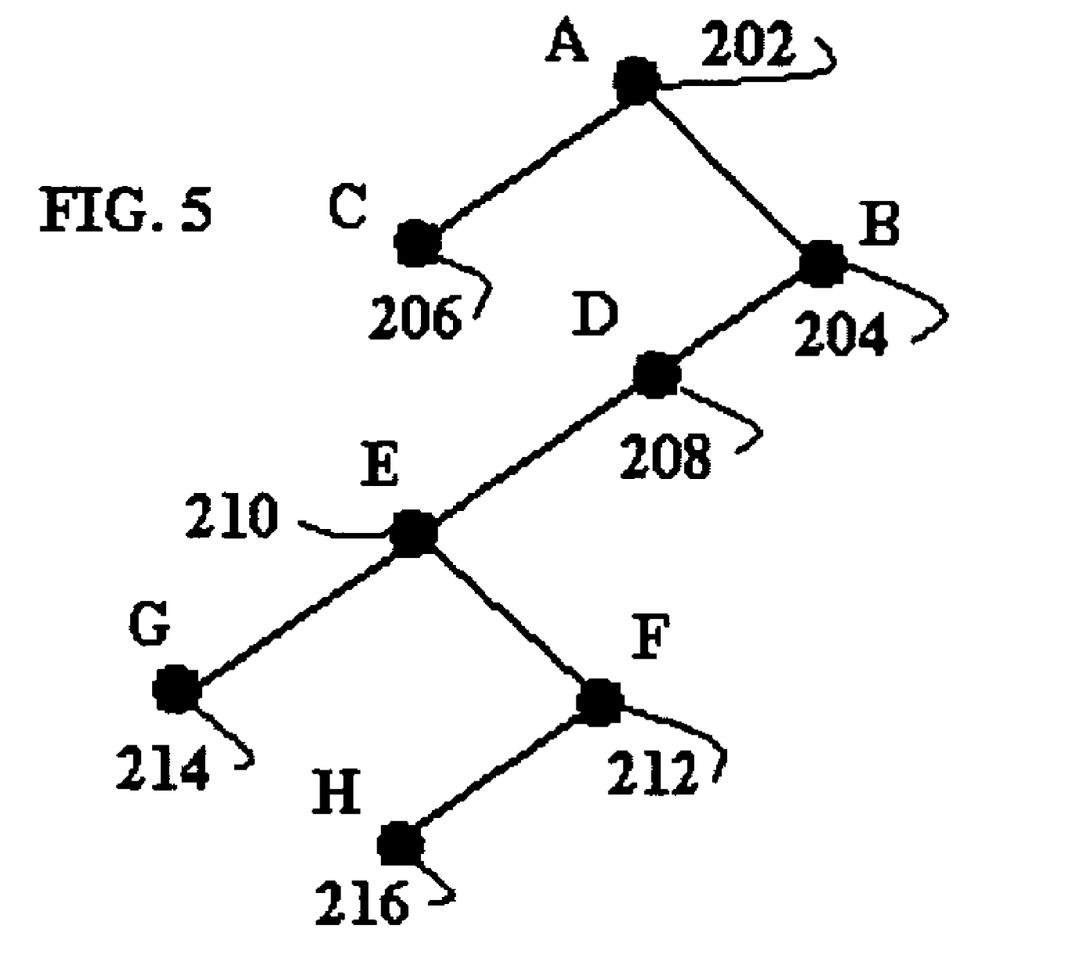
FIG. 5 is a spanning tree diagram corresponding to the network of FIG. 2 after an alternative, second failure.

If, on the other hand, instead of link 232 failing, link 224 fails between nodes C and D in the network topology shown in FIG. 2, then the resultant changes to the SPT are shown in FIG. 5 which depicts a spanning tree diagram for that alternative changed topology. In that case it can be seen that node D is reattached at node B and nodes E, F, G and H also reattach to the branch at node B. Accordingly the incremental SPF approach could incorporate a greater computational burden than simply recalculating the SPF as it would first be necessary to identify all of the affected nodes, that is nodes D, E, F, G and H and then recompute their attachments. Accordingly, as set out in the method described herein, it is desirable to identify whether I-SPF will in fact reduce the computational burden over a full SPF computation. It will be noted that although, in the example shown above with reference to FIGS. 2 to 5, a local and remote failure are used to illustrate where I-SPF may be inappropriate, in other topologies local failures may be repaired by I-SPF very efficiently whereas remote failures may not as accommodated by the present approach.

Figure 6:
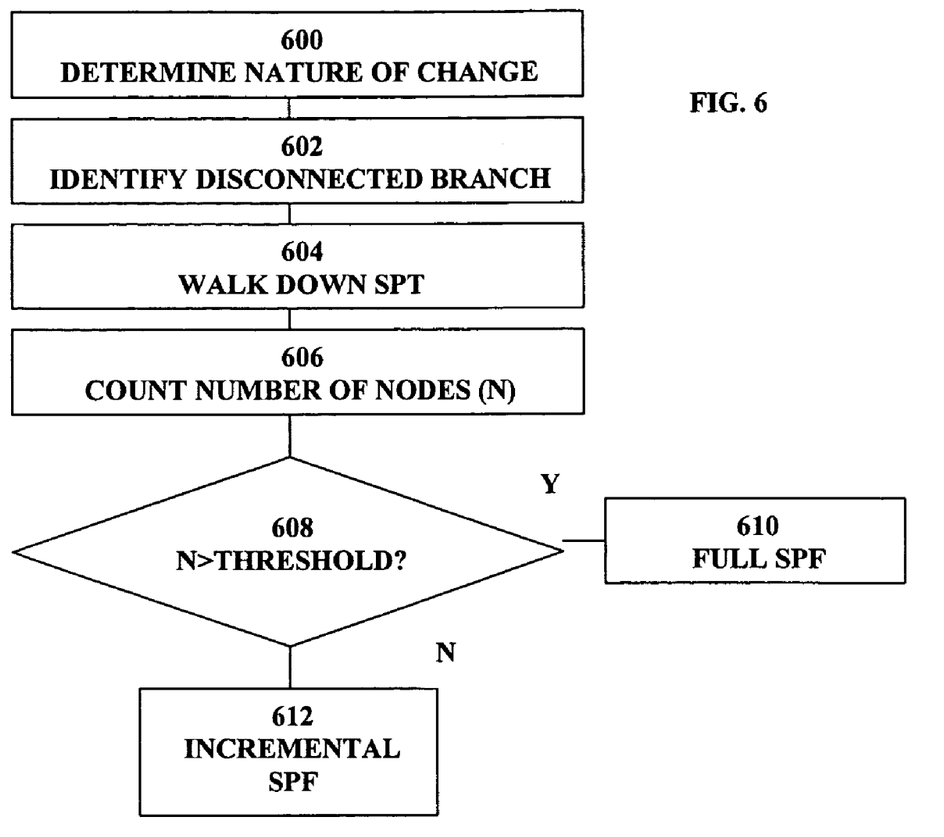
FIG. 6 is a flow diagram illustrating at a low level a method of constructing a forwarding information structure.

The manner in which the SPT is constructed following a topology change can be further understood with reference to FIG. 6 which is a low level flow diagram illustrating implementation of the method.

In block 600 the constructing node receives an advertisement of a network change and determines the nature of the topological changed carried within the routing update. In particular the constructing node identifies whether the changes comprises a component failure in which case, in block 602 the constructing node identifies the branch that has been disconnected or detached from the SPT as a result of the failure.

In block 604 the constructing node identifies the number of affected nodes by walking down the SPT starting at the child node of the link failure. For example in the case of the network topology discussed with reference to FIGS. 2 to 5 and in the case of the failure of link 224 between node C and node D, the constructing node starts at node D as the child node of the link failure and walks down the tree to node E and then down each branch to nodes F and G, and H respectively. Accordingly the SPT walk is carried out by taking the link failure child node neighbors, and for each of them recursively walking down the branch. In block 606 the number of nodes are counted by incrementing a node counter each time a node is encountered on the SPT walk.

In block 608, if the number of nodes (N) exceeds a threshold then, in block 610, a full SPF recomputation is triggered to construct the SPT. On the other hand if the number of nodes does not exceed the threshold then an I-SPF is triggered in block 612. It will be appreciated that the threshold check in block 608 can be carried out once the SPT walk has been completed or it can be carried out each time the node counter is incremented in which case the SPT walk can be terminated as soon as the number of counted nodes exceeds the threshold. Following construction of the SPT, whether by I-SPF or a full SPF, further updating of the RIB and FIB can be carried out based on the recomputed or updated SPT as will be well known to the skilled person and without requiring detailed discussion here.

The manner in which the threshold number is determined can be adopted as appropriate as long as it is ensured that the number of nodes requiring re-attachment using I-SPF does not become so high that it would require more computational effort than simply rebuilding the full SPT from scratch. For example a fixed number of nodes can be set as the threshold, or a proportional number of nodes relative to the number of nodes in the LSDB or, if different, the number of nodes in the SPT, the number or proportions being derivable, for example, by modeling.

The manner in which the method described herein is implemented may be in software, firmware, hardware or any combination thereof and with any appropriate code changes as will be apparent to the skilled reader without the need for detailed description here. For example the algorithm shown in FIG. 6 can be implemented in any appropriate part of the hardware or software of a router and/or any appropriate SPT walk algorithm can be constructed or utilized as will be fully familiar to the skilled person and without requiring detailed discussion here. The approach described can be applied at any node on which I-SPF is implemented as constructing node. Of course, in a network where not all nodes are I-SPF implemented, then those nodes which are can adopt the algorithm with no effect on forwarding within the network as a whole. The approach is effective for both link failure and node failure, where the latter is manifested as failure of all the attached links.

As a result of the approaches described above it will be seen that I-SPF can be implemented only where it provides an optimization for example in terms of ensuring that a reduced CPU burden is imposed than if a full SPF recomputation were implemented.

4.0 Implementation Mechanisms—Hardware Overview

Figure 7:
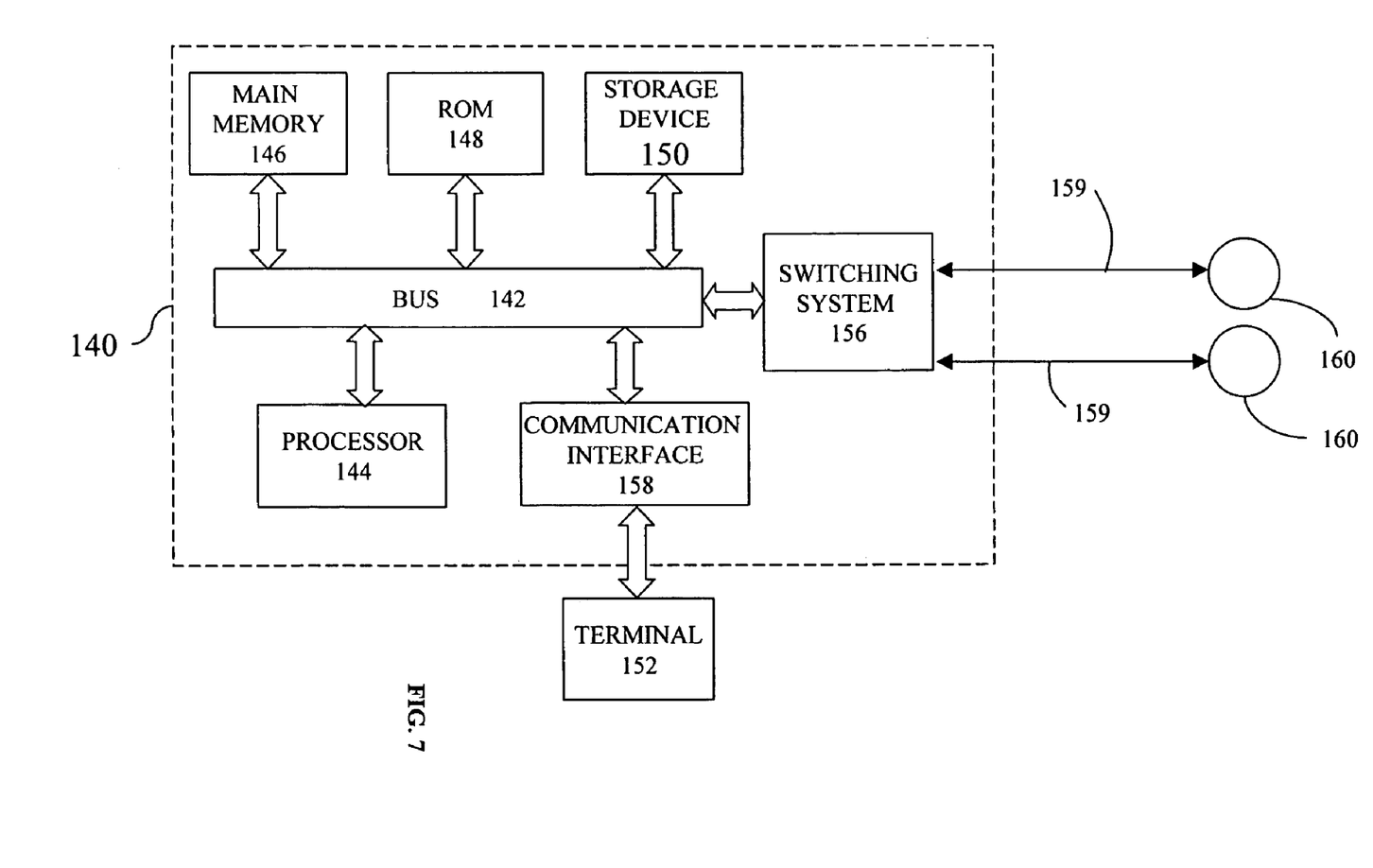
FIG. 7 is a block diagram that illustrates a computer system upon which a method for constructing a forwarding information structure may be implemented.

FIG. 7 is a block diagram that illustrates a computer system 40 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as a constructing node, repairing node or notifying node the above described method of forwarding data. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, and volatile media Non-volatile media includes, for example, optical or magnetic disks, such as storage device 150. Volatile media includes dynamic memory, such as main memory 146.

Common forms of computer-readable media include, for example, a floppy disk, a flexible disk, hard disk, or magnetic tape, a CD-ROM, a RAM, a PROM, and EPROM, a FLASH-EPROM, any other memory chip or cartridge, or any other medium from which a computer can read.

Various forms of computer readable media may be involved in storing one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate routing protocol and mechanism and forwarding paradigm can be adopted to implement the invention. The method steps set out can be carried out in any appropriate order and aspects from the examples and embodiments described juxtaposed or interchanged as appropriate. For example the method can be implemented using link state protocols such as intermediate system-intermediate system (IS-IS) or open shortest path first (OSPF), and network changes detected in the form of Link-State Packets or Advertisements (LSP or LSA) accordingly. The method can be applied in any network of any topology and in relation to any component change in the network for example a link or node failure, or the removal of a network component by an administrator.

What is claimed is:

1. A method of constructing a forwarding information structure for forwarding data in a data communications network comprising as components nodes and links therebetween, the method comprising the steps, performed at a constructing node, of:

detecting a component change; and assessing an extent of a corresponding change required to an existing forwarding information structure at the constructing node; and, selecting a construction strategy for the forwarding information structure dependent on the extent of the corresponding change;

wherein if a number of nodes associated with the corresponding change is above a threshold value, the strategy comprises reconstruction of the entire forwarding information structure.

2. A method as claimed in claim 1 in which the forwarding information structure comprises a spanning tree and the strategy comprises implementing a full shortest path first algorithm (SPF).

3. A method as claimed in claim 1 in which if a number of nodes associated with the corresponding change is not above a threshold value, the strategy comprises identifying an affected part of the forwarding information structure and reconstructing the affected part.

4. A method as claimed in claim 3 in which the forwarding information structure comprises a spanning tree and the strategy comprises implementing an incremental SPF algorithm.

5. A method as claimed in claim 1 in which the step of assessing the extent of a corresponding change required comprises counting a number of affected components.

6. A method as claimed in claim 5 in which the step of assessing further comprises the step of establishing whether the number of affected components exceeds a threshold number.

7. A method as claimed in claim 6 in which the threshold number comprises one of an absolute value, or a proportional value of the total number of components in the forwarding information structure or the network topology for which it is derived.

8. A method as claimed in claim 5 in which the forwarding information structure comprises a spanning tree and the step of counting comprises implementing a spanning tree walk of child components of the changed component.

9. A method as claimed in claim 8 further comprising incrementing a counter for each child component counted.

10. A method as claimed in claim 9 comprising stopping the spanning tree walk if a value of the counter exceeds a threshold number and reconstructing the entire forwarding information structure.

11. A method as claimed in claim 9 in which, if the incremented counter value does not exceed a threshold number, further comprising the steps of identifying the affected part of the forwarding information structure and reconstructing the affected part.

12. A method as claimed claim 1 in which the step of detecting a component change comprises receiving a notification of the component change.

13. A method as claimed in claim 1 in which the component change comprises a component failure.

14. A method as claimed in claim 1 further comprising the step of reconstructing the forwarding information structure and forwarding data according to the reconstructed structure.

15. A computer readable medium comprising one or more sequences of instructions for constructing a forwarding information structure which instructions, when executed by one or more processors, cause the one or more processors to perform:
    detecting a component change; and
    assessing an extent of a corresponding change required to an existing forwarding information structure at the constructing node; and,
    selecting a construction strategy for the forwarding information structure dependent on the extent of the corresponding change;
    wherein if a number of nodes associated with the corresponding change is above a threshold value, the strategy comprises reconstruction of the entire forwarding information structure.

16. An apparatus for constructing a forwarding information structure, the apparatus comprising:
    one or more processors;
    a network interface communicatively coupled to the processor and configured to communicate one or more packet flows among the processor and network; and
    a computer readable medium comprising one or more sequences of instructions for constructing a forwarding information structure which instructions, when executed by one or more processors, cause the one or more processors to perform:
    detecting a component change; and
    assessing an extent of a corresponding change required to an existing forwarding information structure at the constructing node; and,
    selecting a construction strategy for the forwarding information structure dependent on the extent of the corresponding change;
    wherein if a number of nodes associated with the corresponding change is above a threshold value, the strategy comprises reconstruction of the entire forwarding information structure.

17. An apparatus for constructing a forwarding information structure for forwarding data in a data communications network comprising as components nodes and links therebetween, the apparatus comprising:
    means for detecting a component change; and
    means for assessing the extent of a corresponding change required to an existing forwarding information structure; and,
    means for selecting a construction strategy for the forwarding information structure dependent on the extent of the corresponding change;
    wherein if a number of nodes associated with the corresponding change is above a threshold value, the strategy comprises reconstruction of the entire forwarding information structure.

18. The computer readable medium of claim 15, in which if a number of nodes associated with the corresponding change is not above a threshold value, the strategy comprises identifying an affected part of the forwarding information structure and reconstructing the affected part.

19. The computer readable medium of claim 18, in which the forwarding information structure comprises a spanning tree and the strategy comprises implementing an incremental SPF algorithm.

20. The computer readable medium of claim 15, in which the step of assessing the extent of the corresponding change comprises counting a number of affected components and establishing whether the number of affected components exceeds a threshold number.

21. The apparatus of claim 16, in which, if the number of nodes associated with the corresponding change is above a threshold value, the strategy comprises reconstruction of the entire forwarding information structure.

22. The apparatus of claim 16, in which if a number of nodes associated with the corresponding change is not above a threshold value, the strategy comprises identifying an affected part of the forwarding information structure and reconstructing the affected part.

23. The apparatus of claim 22, in which the forwarding information structure comprises a spanning tree and the strategy comprises implementing an incremental SPF algorithm.

24. The apparatus of claim 16, in which the step of assessing the extent of a corresponding change required comprises counting a number of affected components.

* * * * *